No. 798,556. PATENTED AUG. 29, 1905.
V. ANGERER.
RAILWAY SWITCH.
APPLICATION FILED JUNE 8, 1905.

Inventor:
Victor Angerer
by his Attorneys.

UNITED STATES PATENT OFFICE.

VICTOR ANGERER, OF RIDLEY PARK, PENNSYLVANIA, ASSIGNOR TO WILLIAM WHARTON, JR., & COMPANY, INCORPORATED, OF PHILADELPHIA, PENNSYLVANIA, A CORPORATION OF PENNSYLVANIA.

RAILWAY-SWITCH.

No. 798,556.     Specification of Letters Patent.     Patented Aug. 29, 1905.

Application filed June 8, 1905. Serial No. 264,306.

*To all whom it may concern:*

Be it known that I, VICTOR ANGERER, a citizen of the United States, residing at Ridley Park, Pennsylvania, have invented certain Improvements in Railway-Switches, of which the following is a specification.

My invention relates particularly to switches used on street-railways and trolley-roads which are shifted by the motorman or driver of the car.

The object of my invention is to provide means for preventing the accidental shifting of the switch while the car is passing over it.

This type of switch as ordinarily constructed is liable in some instances, especially when a swing-truck car is passing over the switch to accidentally shift by the action of the wheels between the time that the forward and rear trucks pass over the switch. Consequently one truck may take the turnout while the other truck may remain on the main line, causing in some instances serious accidents.

Figure 1:
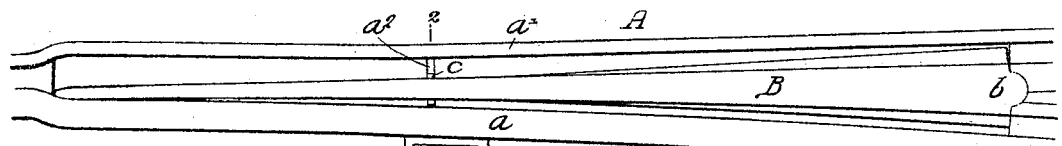
Figure 1:
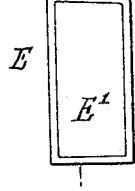
Figure 2:
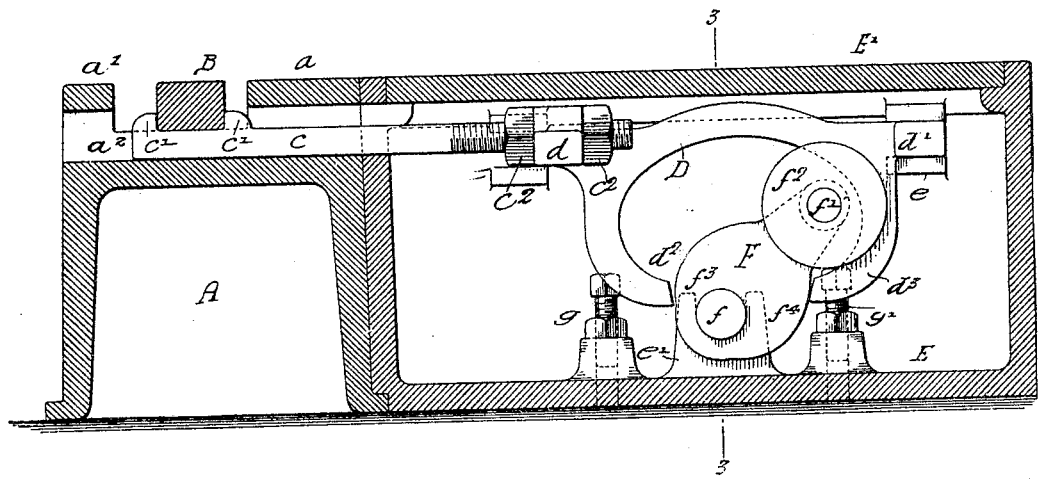
Figure 3:
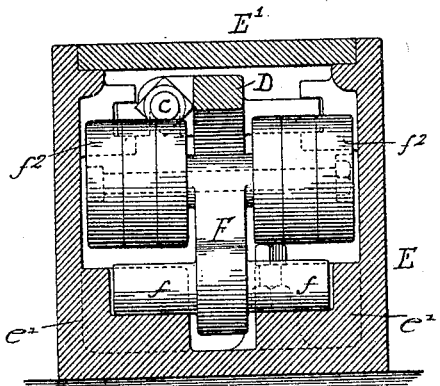

In the accompanying drawings, Figure 1 is a plan view of a pivoted tongue-switch illustrating my invention. Fig. 2 is an enlarged sectional view on the line 2 2, Fig. 1. Fig. 3 is a sectional view on the line 3 3, Fig. 2.

A is the body of the switch.

B is the tongue, pivoted in any suitable manner at $b$ to the switch-body. The tongue rests in the space between the tread-surface $a$ of the switch-body and the guard $a'$, as clearly shown in Fig. 2. The switch is shifted from one position to the other by means of a bar inserted in the space between the tongue and the tread-section or between the tongue and the guard.

Positive locks are objectionable in this type of switch, as they not only must be quickly operated by the insertion of a bar, but the tongue must be so arranged that it can be thrown by a car trailing through the switch; but the tongue must be prevented from shifting accidentally during the time a car is passing over the switch point on. By my invention I am enabled to place sufficient resistance on the switch-tongue that while it can be moved in the ordinary manner by a bar it cannot be accidentally misplaced.

$a^2$ is a transverse channel in the switch-body A, in which slides a bar $c$, having lugs $c'$ extending on each side of the switch-tongue B in the present instance; but in some instances the bar may be made integral with the tongue. This bar $c$ is threaded at one end and passes through a perforated lug $d$ on the frame D. On the rear end of the frame is a lug $d'$, adapted to guides $e$ in the box E. This box E is mounted on one side of the body A of the switch and is secured to it in any suitable manner. On the bottom of the box are two bearings $e'$, open at the top, and mounted in the bearings are the trunnions $f$ of a lever F, weighted at the outer end. In the present instance there is a transverse rod $f'$ passing through the end of the lever F, and on each end of this rod are weights $f^2$, as clearly shown in Fig. 3. The weights are adjustable, so that the amount of weight can be regulated as desired.

The lever F has two cam-surfaces $f^3 f^4$, and projecting from the frame D are arms $d^2 d^3$, which bear against the cam-surfaces $f^3$ and $f^4$, respectively. Mounted in the bottom of the box E are set-screws $g$ $g'$, which limit the throw of the lever F. These screws are adjustable and can be locked in their adjusted positions by nuts, as shown.

As illustrated in the drawings, the tongue B is set for the main line, and the lever F is thrown so as to place sufficient pressure on the arm $d^3$ of the frame D to prevent the tongue being shifted accidentally; but when it is desired to shift the tongue the operator simply places a lever in the space between the tongue and the tread-surface $a$, using sufficient pressure to cause the arm $d^3$ of the frame D to raise the lever F until it passes over the center, when the weight of the lever will aid the operator in completing the shifting movement, as the lever will bear upon the arm $d^2$ of the frame and the weight on the lever will eventually strike the stop $g$. In order to accomplish this movement, the arms $d^2$ and $d^3$ act upon the cam-surfaces of the lever F above the pivot $f$ of the lever, and the ends of the arms can be so formed that it will require more or less pressure by the operator to shift the tongue not only on account of the leverage, but also on account of the friction produced by the pressure on the faces of the cam and arms that are in contact.

If the tongue does not accurately fit the body of the switch, all that is necessary is to adjust the nuts $c^2$ on the rod $c$, when any lost motion can be readily taken up.

The box E preferably extends to the street-level and is provided with a suitable cover E', so that access may be had to the box at any time.

It will be understood that the box may be situated on either side of the switch structure.

I claim as my invention—

1. The combination in a switch structure, of a body portion, a pivoted switch-tongue, a pivoted weighted lever, a frame connected to the switch-tongue and having arms bearing against the lever so that the lever will hold the switch-tongue in either position to which it is adjusted but will allow the switch-tongue to be shifted by the operator, substantially as described.

2. The combination in a switch structure, of a body portion, a pivoted switch-tongue, a weighted lever, a pivot therefor, a frame connected to the switch-tongue and having arms acting on each side of the lever above the pivot so that the lever will hold the switch-tongue against accidental displacement but will allow for the movement of the switch-tongue by the operator, substantially as described.

3. The combination of a body portion, a pivoted tongue, a pivoted weighted lever having cam-faces at each side, a frame connected to the switch-tongue and having arms bearing against the cam-faces above the pivot, so that the weighted lever will hold the switch-tongue in either position but when pressure is applied to the switch-tongue by the operator the arms of the frame will lift the weighted lever and throw it over the center, substantially as described.

4. The combination of a body portion, a pivoted switch-tongue, a box at one side of the body portion, bearings in the box, a lever having trunnions mounted in the bearings, weights carried by the lever, a frame guided in the box, and a rod connecting the frame to the switch-tongue, said frame having arms extending on each side of the lever and bearing upon it at one side of the pivot, substantially as described.

5. The combination in a switch structure, of a body portion, a pivoted switch-tongue, said body portion having a transverse groove, a rod mounted in the groove and engaging the switch-tongue, a box at one side of the body portion, guides in the box, a frame mounted in the guides and attached to the rod, two arms on the said frame, bearings in the bottom of the box, a lever having trunnions mounted in the bearings, weights carried by the lever, adjustable stops mounted in the box and arranged to limit the movement of the lever, said lever having cam-faces at each side against which bear the arms of the frame, substantially as described.

6. The combination in a switch structure, of a body portion, a pivoted tongue, a box at one side of the body portion, bearings in the box, a lever having trunnions mounted in the bearings, a rod carried by the lever, weights on the rod, set-screws mounted on the box and acting as stops to limit the movement of the lever, a frame arranged to slide in the box, a rod connected to the switch-tongue and adjustably connected to the frame, and arms on said frame arranged to bear on each side of the lever, substantially as described.

In testimony whereof I have signed my name to this specification in the presence of two subscribing witnesses.

VICTOR ANGERER.

Witnesses:
 WILL. A. BARR,
 JOS. H. KLEIN.